(12) United States Patent
Pryor

(10) Patent No.: US 8,814,486 B1
(45) Date of Patent: Aug. 26, 2014

(54) LUBRICATED SCREW DEVICE

(71) Applicant: Charles W. Pryor, Indianapolis, IN (US)

(72) Inventor: Charles W. Pryor, Indianapolis, IN (US)

( * ) Notice: Subject to any disclaimer, the term of this patent is extended or adjusted under 35 U.S.C. 154(b) by 0 days.

(21) Appl. No.: 13/852,088

(22) Filed: Mar. 28, 2013

(51) Int. Cl.
*F16B 35/00* (2006.01)

(52) U.S. Cl.
CPC ............ *F16B 35/005* (2013.01); *Y10S 411/914* (2013.01)
USPC .......................... 411/393; 411/82.3; 411/914

(58) Field of Classification Search
CPC .... F16B 35/005; F16B 35/041; F16B 35/044; F16B 35/04; F16B 35/06; F16B 23/003; F16B 23/0007; F16B 23/0015; F16B 23/0038; F16B 23/0076; F16B 25/0015; F16B 25/0021; F16B 25/0047; F16B 25/00; F16B 33/004; F16B 33/006; F16B 33/02; B25B 5/163; B21H 3/02
USPC ......... 411/82.3, 393, 403, 411, 424, 548, 914
See application file for complete search history.

(56) References Cited

U.S. PATENT DOCUMENTS

| | | | | |
|---|---|---|---|---|
| 281,831 A | * | 7/1883 | Brown | 411/403 |
| 667,555 A | * | 2/1901 | McGahan | 411/378 |
| 1,159,779 A | | 11/1915 | Landau et al. | |
| 1,433,095 A | | 10/1922 | Peary | |
| 1,976,305 A | * | 10/1934 | Swanson et al. | 411/378 |
| 3,355,205 A | * | 11/1967 | Wagner et al. | 403/11 |
| 3,407,903 A | | 10/1968 | Sansabrino | |
| 3,746,068 A | * | 7/1973 | Deckert et al. | 411/258 |
| 4,545,712 A | * | 10/1985 | Wallace | 411/258 |
| 4,632,944 A | * | 12/1986 | Thompson | 522/11 |
| 5,193,958 A | * | 3/1993 | Day | 411/82 |
| 5,214,987 A | | 6/1993 | Fenton, Sr. | |
| 5,260,100 A | * | 11/1993 | Day | 427/386 |
| 6,729,819 B2 | * | 5/2004 | Wallace | 411/11 |
| 7,993,087 B2 | | 8/2011 | Hsieh | |
| D646,152 S | | 10/2011 | Shinjo | |

* cited by examiner

*Primary Examiner* — Roberta Delisle

(57) ABSTRACT

A lubricated screw device lubricates threads as a threaded shaft is screwed into an object. The device includes a screw having a head and a shaft extending from the head. Threading is on the shaft. The threading extends from a distal end of the shaft towards the head. A frangible liner has a perimeter edge. The perimeter edge is coupled to the shaft. The liner forms a pouch around the distal end of the shaft. A lubricant is positioned in the pouch wherein the lubricant is configured to be dispensed from the pouch onto the threading as the shaft is screwed into a structure.

6 Claims, 3 Drawing Sheets

LUBRICATED SCREW DEVICE

BACKGROUND OF THE DISCLOSURE

Field of the Disclosure

The disclosure relates to screw devices and more particularly pertains to a new screw device for lubricating threads as a threaded shaft is screwed into an object.

SUMMARY OF THE DISCLOSURE

An embodiment of the disclosure meets the needs presented above by generally comprising a screw having a head and a shaft extending from the head. Threading is on the shaft. The threading extends from a distal end of the shaft towards the head. A frangible liner has a perimeter edge. The perimeter edge is coupled to the shaft. The liner forms a pouch around the distal end of the shaft. A lubricant is positioned in the pouch wherein the lubricant is configured to be dispensed from the pouch onto the threading as the shaft is screwed into a structure.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
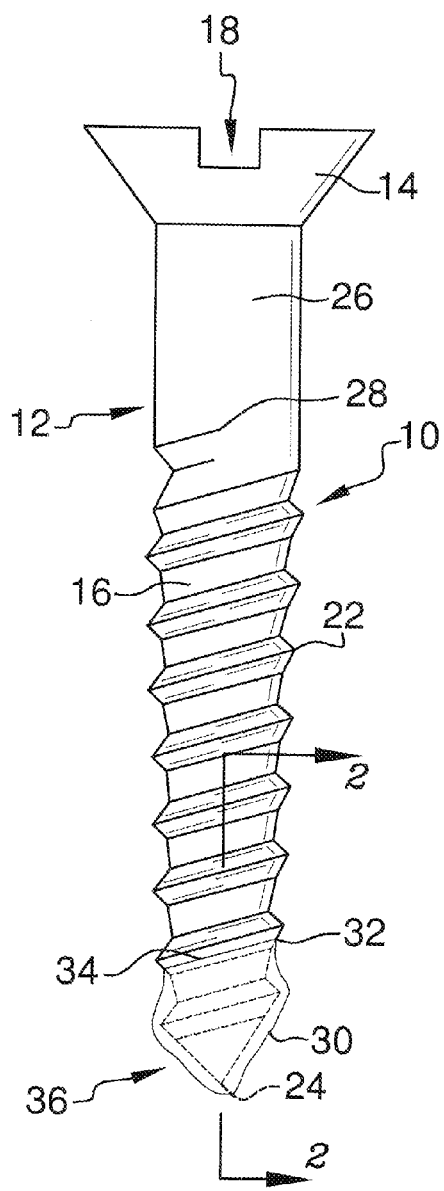
FIG. 1 is a front view of a lubricated screw device according to an embodiment of the disclosure.
Figure 2:
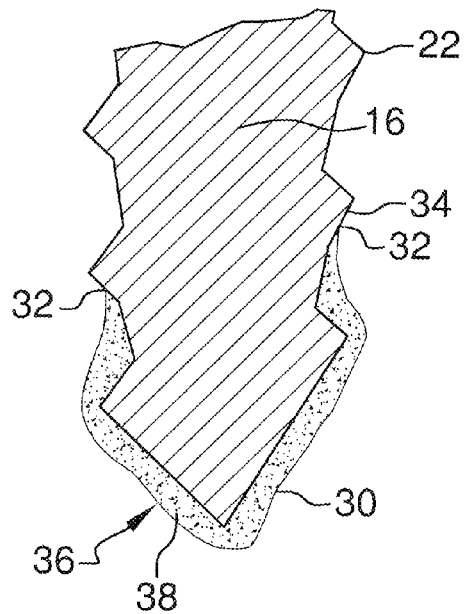
FIG. 2 is a cross-sectional view of an embodiment of the disclosure taken along line 2-2 of FIG. 1.
Figure 3:
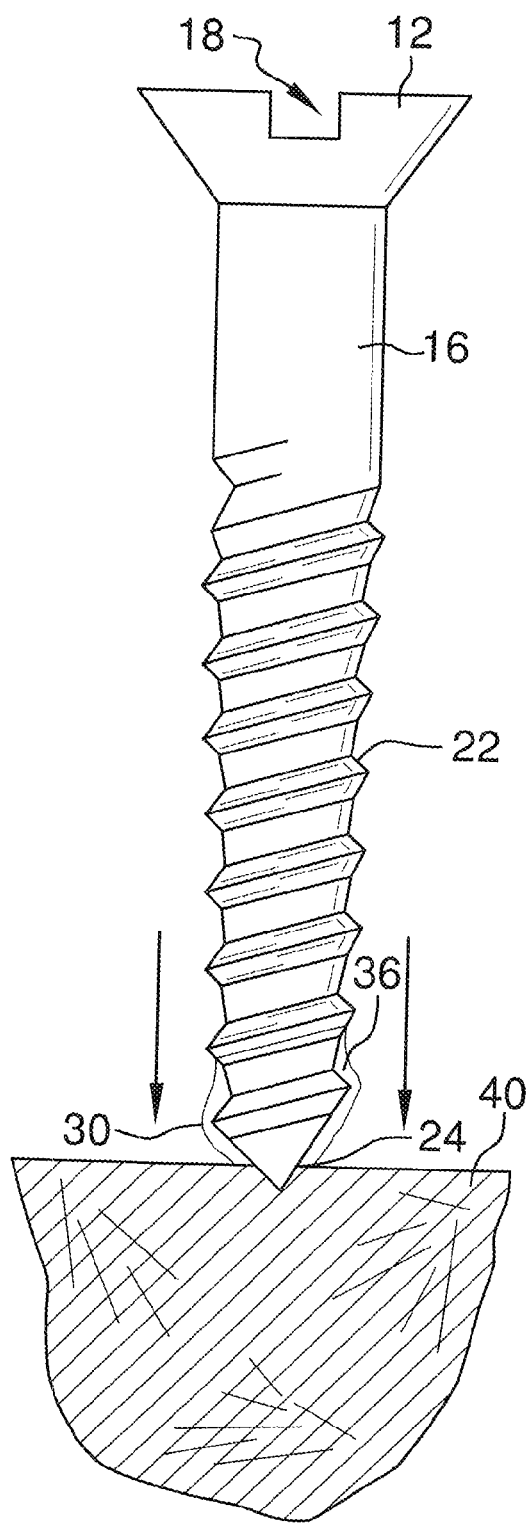
FIG. 3 is a front view of an embodiment of the disclosure during insertion.
Figure 4:
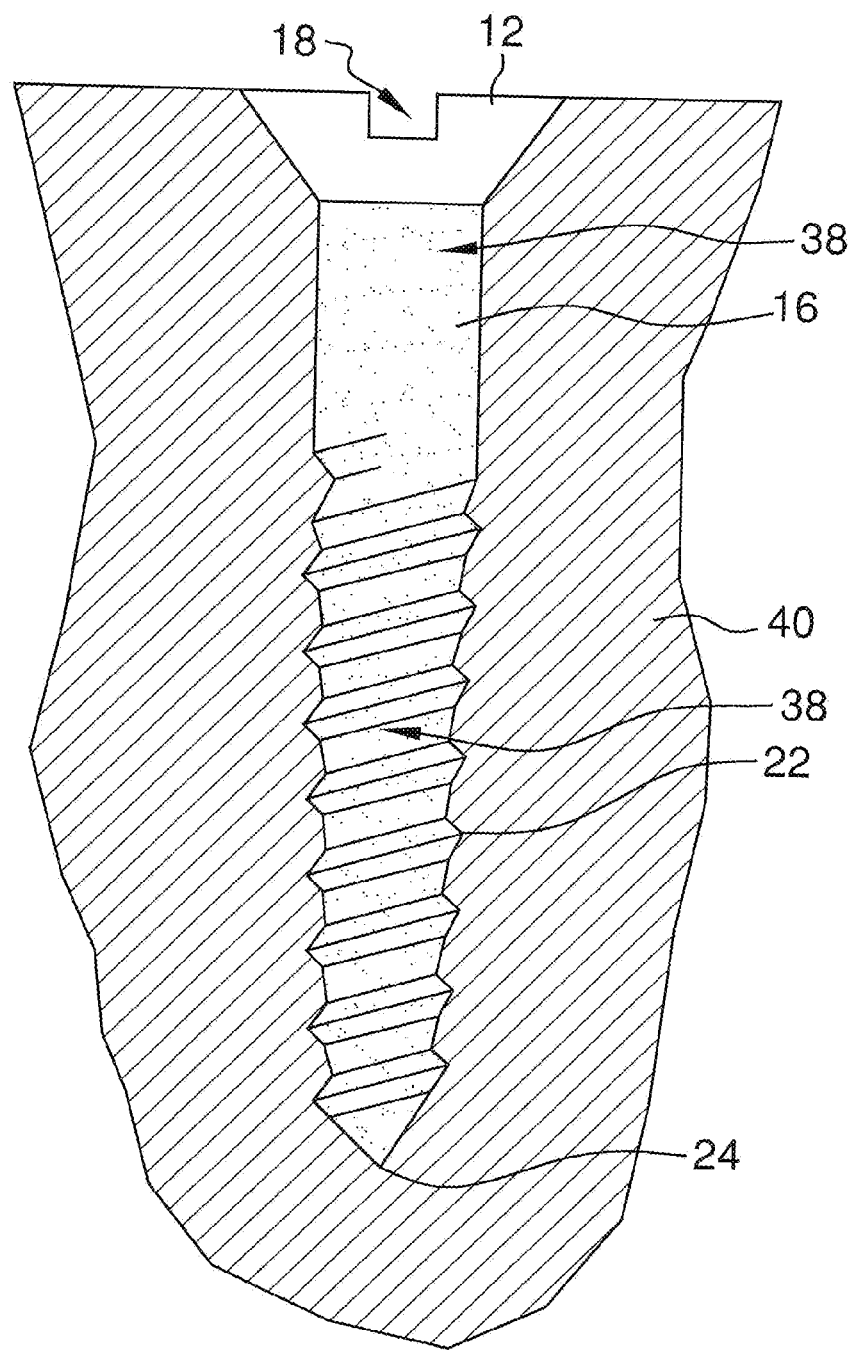
FIG. 4 is a front view of an embodiment of the disclosure after insertion.

With reference now to the drawings, and in particular to FIGS. 1 through 4 thereof, a new screw device embodying the principles and concepts of an embodiment of the disclosure and generally designated by the reference numeral 10 will be described.

As best illustrated in FIGS. 1 through 4, the lubricated screw device 10 generally comprises a screw 12 having a head 14 and a shaft 16 extending from the head 14. A cavity 18 extends into the head 14. The cavity 18 may be a straight channel, a cross, or other geometric or irregular shape such that the head 14 is configured to be engaged by a driving tool to selectively rotate the shaft 16 by rotation of the driving tool. Threading 22 is on the shaft 16. The threading 22 extends from a distal end 24 of the shaft 16 towards the head 14. The distal end 24 of the shaft 16 is pointed as shown but may also be tapered or flat as is conventionally known for screw type connectors. The shaft 16 may have a smooth section 26 extending between the head 14 and a proximal edge 28 of the threading 22 relative to the head 14. A frangible liner 30 has a perimeter edge 32. The perimeter edge 32 is coupled to the shaft 16 and may extend substantially along a face 34 of the threading 22. The liner 30 forms a pouch 36 around the distal end 24 of the shaft 16. The liner 30 may be constructed of polyethylene. A lubricant 38 is positioned in and enveloped by the pouch 36. The pouch 36 is broken by the pointed distal end 24 of the shaft 16 or by other force between the shaft 16 and a structure 40 when the shaft 16 is driven into the structure 40. Thus, the lubricant 38 is configured to be dispensed from the pouch 36 onto the threading 22 as the shaft 16 is screwed into the structure 40. The structure 40 may be wood, concrete, or another known building material.

In use, the screw 12 is driven into the structure 40 in conventional fashion. Conventional driving of the screw 12 breaks the pouch 36 dispensing the lubricant 22 onto the threading as the shaft 16 is driven fully into the structure 40.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lubricated screw device comprising:
a screw having a head and a shaft extending from said head;
threading on said shaft, said threading extending from a distal end of said shaft towards said head;
a frangible liner having a perimeter edge, said perimeter edge being coupled to said shaft, said liner forming a pouch around said distal end of said shaft; and
a lubricant positioned in said pouch wherein said lubricant is configured to be dispensed from said pouch onto said threading as said shaft is screwed into a structure, said pouch being broken by force between said shaft and the structure when said shaft is driven into the structure.

2. The device of claim 1, further comprising said distal end of said shaft being pointed.

3. The device of claim 1, further comprising said shaft having a smooth section extending between said head and a proximal edge of said threading relative to said head.

4. The device of claim 1, further comprising said liner being constructed of polyethylene.

5. The device of claim 1, further comprising a cavity extending into said head wherein said head is configured to be engaged by a driving tool to selectively rotate said shaft.

6. A lubricated screw device comprising:

a screw having a head and a shaft extending from said head;

a cavity extending into said head wherein said head is configured to be engaged by a driving tool to selectively rotate said shaft;

threading on said shaft, said threading extending from a distal end of said shaft towards said head, said distal end of said shaft being pointed, said shaft having a smooth section extending between said head and a proximal edge of said threading relative to said head;

a frangible liner having a perimeter edge, said perimeter edge being coupled to said shaft, said liner forming a pouch around said distal end of said shaft, said liner being constructed of polyethylene; and a lubricant positioned in said pouch wherein said lubricant is configured to be dispensed from said pouch onto said threading as said shaft is screwed into a structure, said pouch being broken by force between said shaft and the structure when said shaft is driven into the structure.

* * * * *